United States Patent [19]
McGaffigan

[11] Patent Number: 5,126,521
[45] Date of Patent: Jun. 30, 1992

[54] SYSTEM FOR PRODUCING HEAT IN ALTERNATING MAGNETIC FIELDS

[75] Inventor: Thomas H. McGaffigan, Half Moon Bay, Calif.

[73] Assignee: Metcal, Inc., Menlo Park, Calif.

[21] Appl. No.: 465,933

[22] Filed: Jan. 16, 1990

Related U.S. Application Data

[63] Continuation-in-part of Ser. No. 242,208, Sep. 9, 1988, abandoned, and a continuation-in-part of Ser. No. 404,621, Sep. 8, 1989.

[51] Int. Cl.$^5$ .............................................. H05B 6/10
[52] U.S. Cl. .............................. 219/10.75; 219/85.11; 219/10.43; 219/10.491
[58] Field of Search ................. 219/10.75, 85.11, 85.1, 219/10.41, 10.43, 10.491, 10.53, 10.55 F, 9.5; 428/403; 156/272.4, 274.2, 379.6, 380.2

[56] References Cited

U.S. PATENT DOCUMENTS

| | | | |
|---|---|---|---|
| 1,975,436 | 10/1934 | Sorrel et al. | 219/13 |
| 1,975,437 | 10/1934 | Sorrel et al. | 219/13 |
| 2,393,541 | 1/1946 | Kohler | 20/0.5 |
| 3,191,132 | 6/1965 | Mayer | 333/79 |
| 3,309,633 | 3/1967 | Mayer | 333/79 |
| 3,391,846 | 7/1968 | White | 229/17 |
| 3,461,014 | 8/1969 | James | 156/272 |

(List continued on next page.)

FOREIGN PATENT DOCUMENTS 41-2676 2/1966 Japan .
41-2677 4/1966 Japan .

OTHER PUBLICATIONS

Brailsford, F., *Magnetic Materials*, 3rd Ed. (1960).
Lee, E. W., *Magnetism, An Introductory Survey*, pp. 201-204 (1970).
Murakami, K., *IEEE Transactions on Magnetics*, Jun. 1965, pp. 96-100.
Smit et al., *Ferrites* (1959) pp. 155-160.
Smith et al., *Adv. Electronics*, 6: 69 (1954).
Chen, *Magnetism and Metallurgy of Soft Magnetic Materials*, p. 405 (1986).

*Primary Examiner*—Philip H. Leung
*Attorney, Agent, or Firm*—Burns, Doane, Swecker & Mathis

[57] ABSTRACT

This invention provides a system for providing heating in an alternating magnetic field using lossy heat producing magnetic particles. This invention disclosed a system comprising a combination of particles wherein the first particles are lossy heat producing particles, which have a preselected Curie temperature to provide self-regulating heating in the alternating magnetic field, and the second particles are nonlossy particles which have high permeability which are not heat producing particles but which maintain the coupling of the magnetic circuit and maintain the desired magnetic field focus and intensity through the area in which the first lossy heat producing particles are positioned. Thus, in this invention, when the first lossy heating particles approach or are at their Curie temperature and have declining permeability and would otherwise lose the desired coupling with the magnetic circuit, the second nonlossy high permeability particles maintain the coupling of the magnetic circuit as well as the desired intensity of the magnetic field through the first lossy heating particles to provide the desired field strength throughout the heating period. This invention prevents premature loss of heating due to loss of coupling of the magnetic circuit with the lossy heating particles and provide other advantages. This invention also provides magnetic particles coated with an electrically resistive coating, which coated particles exhibit useful properties in the above particle systems.

40 Claims, 3 Drawing Sheets

U.S. PATENT DOCUMENTS

| | | | |
|---|---|---|---|
| 4,428,790 | 1/1984 | Diaz | 156/86 |
| 4,486,721 | 12/1984 | Cornelius et al. | 333/1 |
| 4,632,866 | 12/1986 | Kubota et al. | 428/328 |
| 4,654,511 | 3/1987 | Horsma et al. | 219/548 |
| 4,659,912 | 4/1987 | Derbyshire | 219/535 |
| 4,695,712 | 9/1987 | Busch | 219/10.41 |
| 4,695,713 | 9/1987 | Krumme | 219/553 |
| 4,717,814 | 1/1988 | Krumme | 219/10.77 |
| 4,789,767 | 12/1988 | Doljack | 219/9.5 |
| 4,814,587 | 3/1989 | Carter | 219/10.41 |
| 4,914,267 | 4/1990 | Derbyshire | 219/85.1 |
| 3,510,619 | 5/1970 | Leatherman | 219/10.53 |
| 3,528,867 | 9/1970 | Leatherman | 156/272 |
| 3,548,140 | 12/1970 | O'Neill | 219/10.53 |
| 3,574,031 | 4/1971 | Heller, Jr. et al. | 156/273 |
| 3,652,361 | 3/1972 | Leatherman | 156/272 |
| 3,709,775 | 1/1973 | James | 161/162 |
| 3,802,985 | 4/1974 | Leatherman | 156/244 |
| 3,902,940 | 9/1975 | Heller et al. | 156/79 |
| 3,911,552 | 10/1975 | Trimble et al. | 29/458 |
| 3,923,580 | 12/1975 | Leatherman | 156/272 |
| 3,933,536 | 1/1976 | Doser et al. | 148/105 |
| 3,941,641 | 3/1976 | Heller et al. | 156/272 |
| 3,945,867 | 3/1976 | Heller, Jr. et al. | 156/143 |
| 4,035,547 | 7/1977 | Heller, Jr. et al. | 428/329 |
| 4,107,506 | 8/1978 | Pelegri | 219/85 A |
| 4,256,945 | 3/1981 | Carter et al. | 219/10.75 |
| 4,347,487 | 8/1982 | Martin | 333/1 |

SYSTEM FOR PRODUCING HEAT IN ALTERNATING MAGNETIC FIELDS

RELATED APPLICATIONS

This application is a continuation-in-part of U.S. Ser. No. 07/242,208 filed Sep. 9, 1988, now abandoned and is a continuation-in-part of U.S. Ser. No. 07/404,621 filed Sep. 8, 1989.

FIELD OF THE INVENTION

This invention relates to methods, compositions and systems for providing heat to selected materials by subjecting the combination of the materials and magnetic particles to an alternating magnetic field.

BACKGROUND OF THE INVENTION

The use of ferrite particles to produce heating in alternating magnetic fields is known in the art. As disclosed in U.S. Pat. Nos. 3,391,846 to White and 3,902,940 to Heller et al., ferrite particles have been used to produce heat where it is desired to cause chemical reactions, melt materials, evaporate solvents, produce gases and for other purposes.

PCT International Publication WO84/02098 (Application No. PCT/US83/01851 corresponding to U.S. Pat. No. 4,914,267) of Derbyshire discloses the use of ferromagnetic materials having the desired Curie temperature in electrically conductive layers to provide auto-regulated heating to the Curie temperature of the material upon application of an alternating current to the conductive layer of ferromagnetic material. The power applied to the ferromagnetic layer is in the form of an alternating current source which produces skin effect or eddy current heating in the continuous ferromagnetic layer. As the ferromagnetic layer reaches the Curie temperature, the permeability of the layer drops and the skin depth increases, thereby spreading the current through the wider area of the ferromagnetic layer until the Curie temperature is achieved throughout and the desired heating is achieved.

In my co-pending applications Ser. Nos. 07/242,208 and 07/404,621, incorporated herein by reference, I disclose the use of magnetic particles in combination with heat recoverable articles in an alternating magnetic field to effect heat recovery. While the systems disclosed therein are satisfactory for many applications, I have observed that in some situations the heating provided is not entirely as desired.

In some configurations and in some uses, it has been observed that, when the articles and magnetic particles are subjected to the alternating magnetic field, the initial heating to the Curie point of the particles is generally initiated satisfactorily. However, in some instances the desired continued heating is not maintained and in some instances the heating is uneven over the area of the article. In other applications, the cycling of the heating at or near the Curie point of the particles is not entirely as desired in that undesired cooling occurs before the particles again heat to the Curie temperature. Thus, desired sustained heating is not maintained.

In view of the above characteristics sometimes encountered in the prior art systems, it is an object of this invention to provide an improved system for heating with magnetic particles in alternating magnetic fields. It is an object of this invention to provide a system which produces desired continued heating in a wider range of articles and configurations of substrates. It is a further object of this invention to eliminate undesired temperature cycling sometimes encountered in the prior systems.

SUMMARY OF THE INVENTION

I have now found that the above objects and other utilities and benefits can be achieved in systems involving heating with magnetic particles in alternating magnetic fields by employing the combination of first particles which are lossy heat producing particles and second particles which are nonlossy particles which do not produce heat, but have high permeability and are capable of providing and/or maintaining continued magnetic circuit coupling, even while the first lossy heat producing particles are at or near their Curie temperature and at low or reduced permeability. Consequently, this invention can be summarized by the following.

In one aspect, this invention is a composition comprising particles capable of producing heat upon being subjected to an alternating magnetic field comprising in combination:

(i) first particles which are lossy heating particles and which have a Curie temperature of $T_1$; and (ii) second particles which are nonlossy particles, which have a Curie temperature of $T_2$ and which have high permeability thereby being capable of providing magnetic circuit coupling through the first particles.

In another aspect, this invention is a magnetic particle having an electrically resistive coating thereon.

In another aspect, this invention is a method for providing heat to a substrate comprising:

providing a system of particles in thermal contact with said substrate comprising first particles which are lossy heating particles being capable of producing heat upon being subjected to an alternating magnetic field, and comprising second particles which are nonlossy particles having a high permeability and being capable of providing magnetic circuit coupling through the first particles; and subjecting the substrate and system of particles to an alternating magnetic field.

In another aspect, this invention comprises a system of particles for producing heat when subjected to an alternating magnetic field comprising:

a first layer of particles comprising lossy heating particles which have a Curie temperature of $T_1$; and a second layer of particles comprising nonlossy particles, which have a Curie temperature of $T_2$ and which have high permeability thereby being capable of providing magnetic circuit coupling through the first particles.

In another aspect, this invention comprises an article for use in an alternating magnetic field comprising in combination:

a) a material suitable for heating to a temperature T, and b) a system of particles capable of producing heat upon being subjected to an alternating magnetic field, wherein:

at least a portion of said particles being in thermal contact with said material and thereby being capable of heating said material to at least a temperature of T upon the article being subjected to said alternating magnetic field; and said particles comprise first particles which are lossy heating particles having a Curie temperature of $T_1$ or greater; and second particles which are nonlossy particles which have a Curie temperature of $T_2$ and have high permeability thereby being capable of providing magnetic circuit coupling through the first particles.

In a preferred aspect, this invention comprises a self-heating recoverable article for use in an alternating magnetic field, comprising in combination:

a) a layer of heat recoverable material having recovery temperature T, and b) a system of particles capable of producing heat upon being subjected to an alternating magnetic field, wherein:

at least a portion of said particles being in thermal contact with said layer of heat recoverable material and thereby being capable of heating said material to at least a temperature of T upon the article being subjected to said alternating magnetic field; and said system of particles comprises first particles which are lossy heating particles having a Curie temperature of T or greater; and second particles which are nonlossy particles and have high permeability thereby being capable of providing magnetic circuit coupling when the first particles are at or near their Curie temperature.

In another aspect, this invention comprises an auto-regulating system for heating an article comprising, in combination:

an article for use in an alternating magnetic field, comprising a material in said article suitable for heating to a temperature T, lossy heating particles in thermal contact with said material and thereby being capable of heating said material upon the article being subjected to said alternating magnetic field, and nonlossy particles having sufficiently high permeability whereby they are capable of providing magnetic circuit coupling through the lossy heating particles;

an induction coil adapted to produce said magnetic field; and a power supply being adapted to provide power to the induction coil as alternating current at a frequency effective for heating said particles.

In another aspect, this invention includes an assembly comprising:

an induction coil adapted to produce an alternating magnetic field;

an article positioned in said alternating magnetic field, comprising a material in said article suitable for heating to a temperature T, lossy heating particles in thermal contact with said material and thereby being capable of heating said material upon the article being subjected to said alternating magnetic field, and nonlossy particles having sufficiently high permeability whereby they are capable of providing magnetic circuit coupling through the lossy heating particles; and a power supply connected to said induction coil, said power supply being adapted to provide power to the induction coil as alternating current at a frequency effective for heating said particles.

DESCRIPTION OF THE INVENTION

This invention involves the phenomenon that lossy magnetic particles, such as lossy ferrites having a certain Curie temperature, produce heat when subjected to an alternating magnetic field, and the fact that the magnetic permeability of the particles and the hysteresis losses decline as the Curie temperature is approached. When the Curie temperature is achieved, the permeability of the ferrite particles and the hysteresis losses drop significantly. This is a known mechanism by which the ferrite particles are self-regulating at the Curie temperature in an alternating magnetic field.

However, I have also observed that in many instances when the Curie temperature is achieved and the magnetic permeability of the ferrite particles drops, the coupling between the magnetic circuit and the ferrite particles declines or is lost to a degree that the coupling cannot be sufficiently reestablished when a portion of the particles cool below the Curie temperature. In some instances I have observed that the coupling may not be reestablished at all, particularly where the article containing the ferrite particles has changed significantly, such as in temperature or in geometric configuration relative to the alternating magnetic field. The coupling of the circuit between the ferrite particles and the magnetic field thus in many instances is never satisfactorily maintained or reestablished, though additional heating may be required in order to produce the desired result in the substrate or material being heated. In other applications where the magnetic circuit coupling with the particles is reestablished as the particles cool, temperature cycling may occur, thus increasing the time required for the desired result.

I have concluded that many of the above problems occur because initially the magnetic field is more intense because it is "focused" or directed to the concentration of the magnetic particles when the article is first magnetically coupled by placing it in the alternating magnetic field. As the particles approach and reach the Curie temperature and their magnetic permeability drops, the magnetic field is incrementally released from this "focused" configuration. In some instances, when the particles cool below the Curie temperature and the magnetic permeability again increases the concentration of particles having high permeability at any desired point or at any particular time may be insufficient to again couple the magnetic circuit to continue the desired heating of the ferrite particles and to maintain the Curie temperature for the desired period of time. As mentioned above, this is sometimes due to a temperature change in the material or substrate containing the particles and in other instances is due to the change in geometry of the article, such as occurs with the heat recoverable substrate and articles, or it can be due to some other physical change.

In order to solve the above problem, I have found that more uniform, continued coupling of the magnetic field with the ferrite particles can be maintained by using a second type of particle in combination with the highly lossy heating particles. The second type of particle has high permeability but is not lossy and does not produce significant heat when used in the magnetic field in combination with the highly lossy heat producing particles. It has been found that this second type of nonlossy particle, having high magnetic permeability, maintains the circuit coupling with the alternating magnetic field even while the highly lossy heat producing particles are at their Curie temperature and their magnetic permeability is low or unity. As a result, the combination of particles of this invention provides a system whereby the second particles of high magnetic permeability maintain the coupling of the magnetic circuit, i.e., maintain the focused configuration of magnetic field in the desired area, regardless of the status of the magnetic permeability of the first highly lossy heat producing particles. Thus, as the heat producing particles cool from their Curie temperature, the magnetic field is still coupled and focused by the presence of the second type of particle directly through the highly lossy heating particles. Since the magnetic field is constantly directed at the highly lossy heat producing particles, these particles produce heat at their full potential dependent only on their temperature.

As can be seen from the above, the system of this invention prevents premature loss of the coupling between the magnetic field and the lossy heating particles, because the desired direction and focus of the magnetic field is constantly maintained through the high permeability, non-heat producing particles. This enables the system of this invention to provide continued heating despite large geometrical and/or electromagnetic changes of the system which occur while approaching Curie temperature and during shape change due to heat recovery or other movement of the article in the magnetic field. As can also be seen, the system of this invention eliminates the characteristics previously encountered of undesired premature cooldown, undesired temperature cycling, and nonuniform temperature.

The system of this invention has been found particularly useful in a preferred system comprising the combination of the above particle system and self-heating heat recoverable articles. Its utility in the heat-recoverable article application has been found especially useful where those articles change in geometric shape and change their position with respect to the induction coil generating the alternating magnetic field. The system of this invention provides the advantage that the high permeability, nonlossy non-heat producing particles can maintain the desired focus, intensity and coupling of the magnetic field through the lossy heat producing particles throughout the range of geometric changes of the heat recoverable articles while the lossy heat producing particles are near or at their Curie temperature and have low magnetic permeability.

In view of the above description of this invention it will be apparent to one skilled in the art that this invention can be practiced in numerous embodiments and configurations. In order to further describe and illustrate the present invention the following description of the drawings and the following description of specific and preferred embodiments are set forth.

Figure 1:
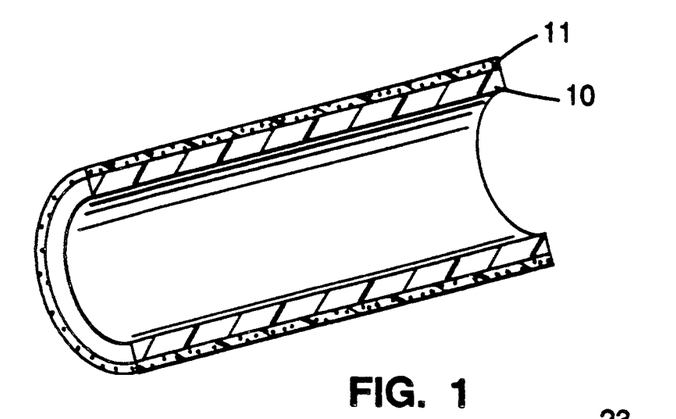
FIG. 1 illustrates in cross section an article to be heated with a layer of particles on the outside surface of the article.

FIG. 1 illustrates an article 10 which is to be heated in an alternating magnetic field wherein the heat is produced by layer of particles 11 on the outside surface of article 10. The particle layer on the surface can be applied as a mixture of the lossy and nonlossy particles described above, or can be applied as a layer of one type of particle and then a layer of the other type of particle. The particles can be held in place on the surface of the article by an adhesive or binder. The particles can remain in place after the desired heating has taken place or can be removed, for example, by using a water soluble binder which can be washed off and the particles removed after the article has been heated as desired. It is pointed out that when it is desired to heat to the Curie temperature of the lossy heating particles in this configuration where the particles are present as a mixture or in adjacent layers, it is desirable that the Curie temperature of the nonlossy non-heat producing particles be greater than the Curie temperature of the highly lossy heat producing particles. This is important because if the nonlossy particles have a Curie temperature lower than the lossy heat producing particles, then the nonlossy particles will decline in magnetic permeability and can cause the decoupling of the magnetic circuit before the desired temperature is reached, namely the Curie temperature of the first lossy heating particles. It is usually desirable for the operation of the present invention that the magnetic permeability of the nonlossy particles does not decline before the maximum desired autoregulated temperature is achieved by the lossy heat producing particles during the heating process. This maximum temperature will normally be the Curie temperature of lossy particles.

The configuration shown in FIG. 1 can also be utilized in an alternative embodiment wherein the Curie temperature of the nonlossy particles is lower than the Curie temperature of the lossy heating particles. In this embodiment the particle system can be formulated for use with a particular magnetic field where the lossy heating particles by themselves are not sufficient to couple with the magnetic circuit or focus the magnetic field to sufficient intensity to cause the lossy heating particles to produce the desired heat. However, the presence of the nonlossy particles causes the field to couple sufficiently with the lossy heating particles to produce the desired heating. When the Curie temperature of the nonlossy particles is reached and their permeability lowers or goes to unity, the magnetic circuit coupling is lost and the heating stops. In this embodiment, the system is self-regulating at the Curie temperature of the nonlossy particles.

While it is usually preferred that the nonlossy particles have a Curie temperature above the Curie temperature of the lossy heating particles, it will be recognized by those skilled in the art that the nonlossy particles may have a Curie temperature below that of the lossy heat producing particles as explained in the above embodiment. Also, this can be useful in those configurations where the nonlossy particles are positioned so that they are effective in maintaining the magnetic coupling through the lossy heat producing particles, but are positioned so that they are not in close thermal contact with, or so that they are thermally insulated from the lossy heat producing particles.

Figure 2:
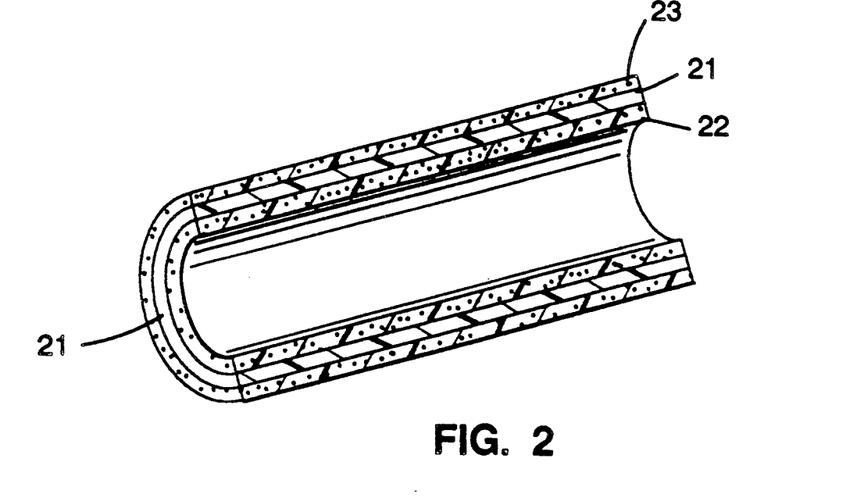
FIG. 2 illustrates in cross section an article to be heated with a layer of first particles on the exterior of the article and a second layer of second particles on the interior surface of the article.

FIG. 2 illustrates article 21 which is to be heated in an alternating magnetic field. The interior surface of article 21 comprises layer 22 of lossy heat producing particles for producing the desired heat and have the desired Curie temperature for the maximum autoregulated temperature which is desired. On the exterior surface of article 21 is a layer 23 of the nonlossy particles which have high permeability. In this particular embodiment, it can be seen that due to the external surface area cooling, the nonlossy particles in layer 23 may be maintained at a temperature considerably lower than the temperature of article 21 and particularly the temperature of the highly lossy heat producing particles in layer 22 in the interior of article 21. In this particular configuration it may not be necessary for the Curie temperature of the nonlossy particles in layer 23 to be higher than the Curie temperature of the lossy heating particles in layer 22, due to the fact that the nonlossy particles in layer 23 may be maintained at a temperature below the Curie temperature of the lossy heating particles in layer 22 and still have the lossy heating particles heat to and self-regulate at their Curie temperature. This embodiment also illustrates that the highly lossy heat producing particles and the nonlossy high permeability particles do not need to be mixed but merely need to be in magnetic proximity to one another, i.e., the nonlossy particles merely need to be in close enough proximity to the lossy heating particles to keep the magnetic field directed or focused through the area in which the lossy heating particles are situated.

Figure 3:
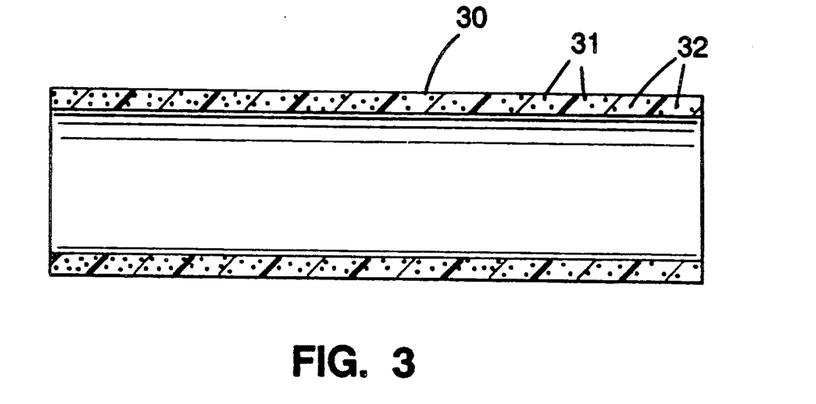
FIG. 3 illustrates in cross section an article to be heated which has particles imbedded and dispersed in the article itself.

FIG. 3 illustrates yet another particular embodiment of this invention wherein article 30, which is intended to be heated, is made of a material which has the lossy heating particles 31 and the nonlossy particles 32 dispersed throughout the material from which article 30 is made. In this embodiment, the lossy and nonlossy particles, which are dispersed in the material according to this invention, provide the desired heating by the lossy particles and the continued magnetic circuit coupling by the nonlossy particles. This provides one embodiment which can be reheated at any time upon exposure to the appropriate alternating magnetic field. As will be recognized by one skilled in the art, other variations of this embodiment will be apparent. For example, either the lossy or the nonlossy particles alone may be dispersed throughout the material from which the article is made and the other particles can be coated on the inside or outside surface of the article as illustrated in FIGS. 1 and 2. As mentioned above, having one particle dispersed in the material and the other particle coated on a surface of the article places the particles in magnetic proximity to one another. When this type of embodiment of the present invention is used it may be particularly desirable to have the nonlossy particles dispersed in the material and have the highly lossy heat producing particles on a surface of the article where the lossy particles can be removed after the desired heating has been effected. In this manner, the heat treated article can then be placed into the desired end use without concern that it will be unintentionally heated upon subsequent exposure to an alternating magnetic field, because the lossy heat producing particles will have been removed, i.e., its self-heating ability will have been removed.

Figure 4:
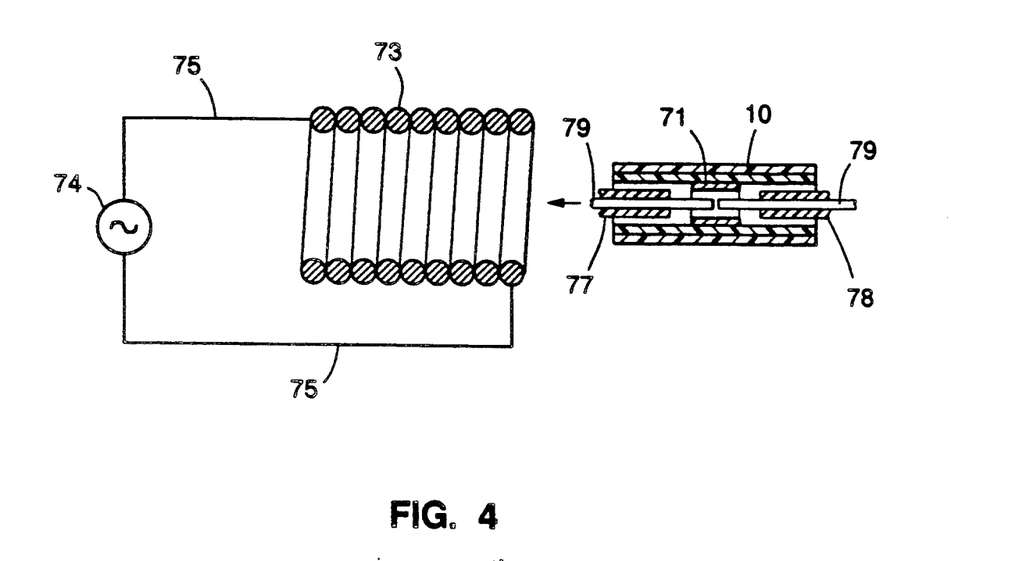
FIG. 4 illustrates in cross section a system according to this invention.

FIG. 4 illustrates a system according to this invention wherein heat-recoverable connector 10 of FIG. 1 containing solder insert 71 is adapted for recovering onto and connecting wires 79. Induction coil 73 (shown in section view) is connected to alternating current power supply 74 by leads 75. Preferably, the power supply is a "constant current" power supply.

The term "constant current" as employed herein, as known in the art, does not mean a current that cannot increase or decrease but means a current that obeys the following formula:

$$\Delta I/I < -\tfrac{1}{2}(\Delta R'_c/R'_c)$$

wherein I is the current and R'c is the coupled resistance, not including the resistance of the inducing coil itself. The induction coil, which is adapted for receiving connector 10, generates an alternating magnetic field in the area of connector 10 causing particles in layer 14 to heat connector 10, thereby melting and fusing solder 71 to the wires 79 and finally recovering the tubing of connector 10 onto substrates 77, 78 and 79.

Figure 5:
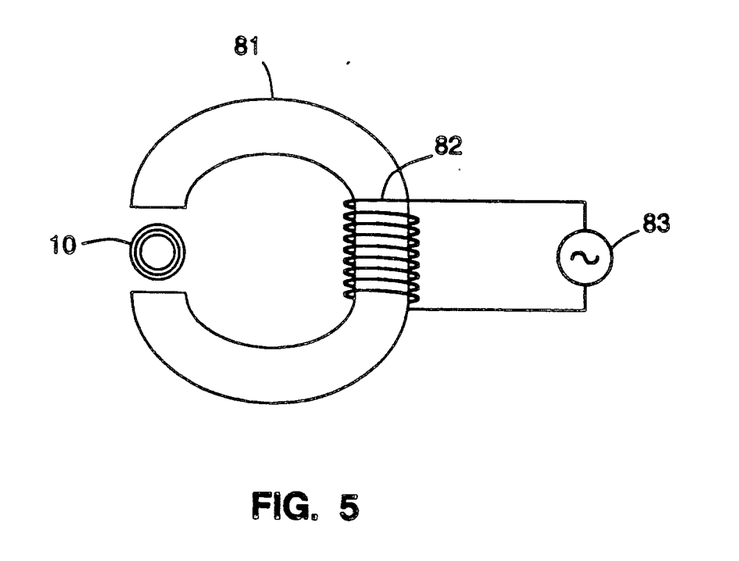
FIG. 5 illustrates in cross section an assembly according to this invention.

FIG. 5 illustrates an assembly according to this invention and illustrates another embodiment for generating the alternating magnetic field for use in this invention. Split toroid core 81 generates a magnetic field in the area adapted for receiving connector 10. Coil 82 is connected to alternating current power supply 83 to produce the desired alternating magnetic field, preferably a constant current power supply as mentioned above.

Figure 6A:
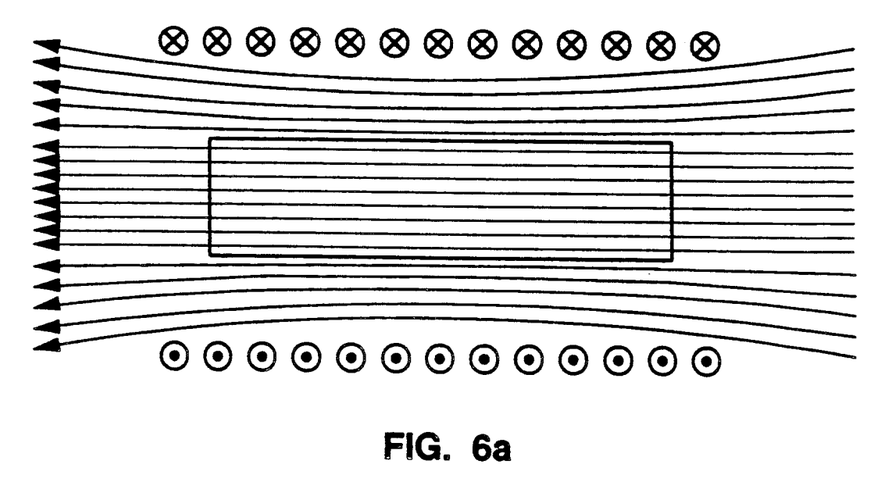
FIGS. 6a and 6b schematically illustrate the focused or intensified magnetic field utilized in this invention.
Figure 6B:
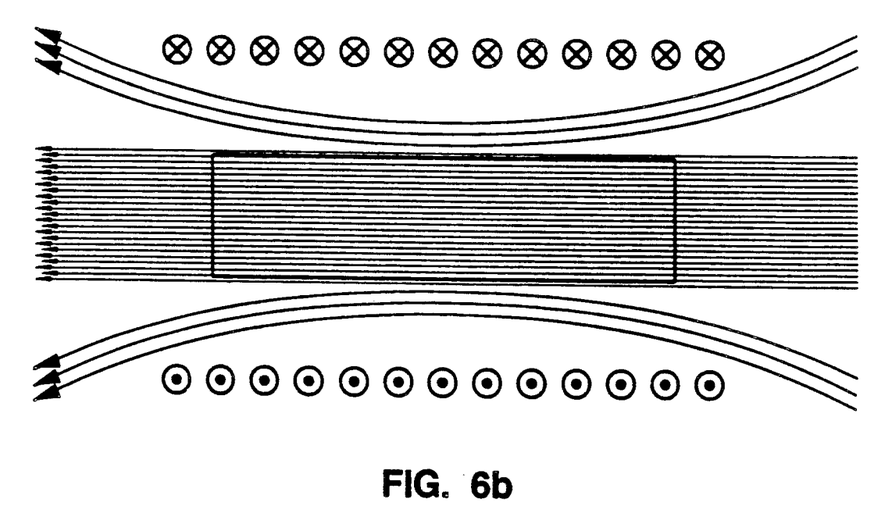

FIGS. 6a and 6b illustrate an example of the difference between a magnetic field which is focused through a magnetic body and a magnetic field which is not focused. FIG. 6b illustrates how the flux lines of a magnetic field are focused and directed through a magnetic body. This corresponds to the embodiment of this invention (a) where the first lossy heating particles are below their Curie temperature, as are the second nonlossy particles, and (b) where the first lossy heating particles are at their Curie temperature, but the second nonlossy particles are present and continue to maintain the coupling and focus of the magnetic field. FIG. 6a illustrates a magnetic field through a nonmagnetic body, which is the same as a single particle system consisting of lossy particles at their Curie temperature and low permeability.

The material referred to herein and illustrated in the above embodiments, which is the material to be heated for a desired purpose, may be thermoplastic material or similar materials which are to be flowed or melted to a different configuration or function, thermosetting or reactive materials which are changed by a chemical reaction at the elevated temperature during heating, materials which are to be crosslinked by heat, materials which are to be dried by removal of moisture or solvents, materials from which gases are to be removed or evolved upon heating, materials which are to be annealed by heat treatment, heat recoverable materials which effect a dimensional or geometric change upon heating, as well as other materials which are desired to be heated without the use of flames, ovens or other conventional sources of heat. This invention is particularly useful in heating heat recoverable articles and particularly those of complex shapes, such as branch-off boots.

A particularly preferred material or substrate for use in the present invention is the class of heat recoverable materials which either shrink, or expand or change shape at a given temperature. Heat recoverable materials are well known in the art and are in general made by heating a polymeric material above its transition temperature, deforming the material into a different shape, typically by stretching or expanding the material, cooling the material in that configuration to a temperature below its transition temperature thus producing a material which is dimensionally heat unstable. When the material is heated above its transition temperature, the dimensionally unstable material tends to return to its original dimension or configuration, i.e., its heat dimensionally stable configuration. One common type of configuration for heat recoverable, particularly heat shrinkable, materials is sleeving and tubing type of articles. However, other forms of heat recoverable materials include flat sheets, particularly tapes which are heat recoverable, and flat sheets which are intended for use as wraparound articles with a closure means and are used to enclose substrates then recovered or shrunk as a sleeve around the substrate. In addition, heat recoverable materials include materials which will expand upon heating to their transition or recovery temperature. In accordance with this invention, the transition or heat recovery temperature of the materials is such that the governing Curie temperature of the particles in the system of the present invention is above or equal to the recovery or transition temperature of the heat recoverable material.

The term "lossy heating particles" as used herein means any particle having particular properties which result in the particles being capable of generating sufficient heat for purposes of this invention when subjected to an alternating magnetic field having a specified frequency. Thus, any particle having these properties and being useful in the present invention is within the scope of this definition. As pointed out herein, there has been inconsistent and/or confusing terminology used in association with particles which respond to magnetic fields. While not being bound by particular terminology, the lossy heating particles useful in this invention generally fall into the two categories of particles known as ferromagnetic particles and ferrimagnetic particles.

In general, the ferrimagnetic particles, such as ferrites, are preferred because they are usually non-conductive particles and because they produce heat by hysteresis losses when subjected to an alternating magnetic field. Therefore, ferrimagnetic particles will produce heating by hysteresis losses in the appropriate alternating magnetic field, essentially regardless of whether the particle size is large or small. Also, by composing the article of ferrite particles the article can maintain its non-conductive, insulating properties.

Also useful in this invention, and preferred in some applications, are the ferromagnetic particles which are usually electrically conductive. Ferromagnetic particles will produce heating dominated by hysteresis losses if the particle size is small enough, since the eddy current heating diminishes with decreasing particle size. However, since ferromagnetic particles are conductive, larger particles will produce significant heating by eddy current losses.

It is generally preferred in the practice of this invention to provide heating by hysteresis losses because, the particle size can be much smaller for effective hysteresis loss heating than with effective eddy current heating. With eddy current heating, the particles will be larger to provide sufficient surface area on each particle for effective eddy current losses. With hysteresis loss heating, the smaller particle size enables more uniform heating of the article and does not degrade the mechanical properties of the material, because the smaller particles can be more dispersed than larger particles. The more dispersed, smaller particles thereby usually provide more efficient heating. In the case of the non-conductive particles, the electrical and insulating properties of the material are not diminished. Thus, the particles can be as large or as small as desired and as allowed by the mechanical and electrical properties desired. However, the particle size is to be at least one magnetic domain in size in order to provide the necessary hysteresis loss, i.e., the particles are preferably as small as practical but are multi-domain particles.

In another aspect of this invention, the heating produced by the magnetic particles useful in the present invention can be enhanced or can be provided by coating the particles with an electrically resistive coating. This is particularly useful with the lossy heating particles, such as ferrites, which exhibit hysteresis loss heating Such particles can be significantly enhanced in their heating effectiveness with such a resistive coating, thereby providing lossy particles which produce heating both by hysteresis losses and by eddy current losses. As will be recognized by one skilled in the art, particles that are not lossy because they do not exhibit hysteresis or eddy current losses, can be converted to lossy heating particles for use in this invention by placing such a resistive coating on the particles. The electrically resistive coating produces significant eddy current losses associated with the surface effect of the coated particles. As used herein, "coating" includes what is sometimes referred to as "plating" the particles with a resistive material such as a metal. The term "electrically resistive" coating includes any material which is sufficiently electrically conductive to produce eddy current effects in a surface layer and can be configured to produce heating in a particular current flow. Thus, the coating material can comprise metal, conductive polymer, carbon, graphite, and other electrically conductive materials. The thickness of the coating on the particle will depend on the conductivity of the coating material, the current flow or power level to which the coated particles are to be subjected in order to produce eddy current losses and heating. For example, at a given power a more conductive coating material like copper may need to be present as a thinner coating in order to exhibit the desired system resistivity to produce the desired heating, compared to a less conductive coating material like iron, which may exhibit the desired system resistivity and produce the desired heating under the same power when present as a thicker coating. Determination of the desired thickness of the coating on the particles will be apparent to one skilled in the art from the magnetic field to be used, frequency of the alternating magnetic field, power level, particle size and other factors normally associated with resistive heating and induction heating. Thus, as used herein, "electrically resistive coating" functionally defines the coating on the particle as being an appropriate material present in an appropriate thickness to produce the desired heating in a given magnetic field. If a coating on a magnetic particle is too thick to produce eddy current losses, it is not an electrically resistive coating within the scope of this invention, regardless of material.

The coated magnetic particles of this invention can be prepared by any known method of coating particles, particularly coating particles with metals. For example, it is known that various particles such as glass and plastic in sizes down to at least 5 microns can be coated at various thicknesses of coating with metals such as iron, nickel and aluminum. Metal coated particles made to most any specification are commercially available from a number of sources, including Versar Manufacturing, Inc., Chantilly, Va.

The coated magnetic particles of this invention are useful as self-regulating particles just as the uncoated particles are, even though the coating on the particle may not itself be self-regulating with an appropriate Curie temperature for the desired use. Coated lossy magnetic particles can be used according to this invention so that they are self-regulating at the Curie temperature of the lossy magnetic particle itself. For example, when the coating on the lossy heating particles enhances but does not provide the major portion of the total heat, the heating system of this invention will regulate at the Curie temperature of the particle, because the continued heating from the eddy current losses in the coating by itself does not produce enough heat to cause continued temperature rise of the article when the lossy particle itself is at its Curie temperature and not producing heat. When the coated magnetic particle is a coated nonlossy particle (and thereby functioning in total as a lossy heating particle) which is producing all of its heat from the surface resistive coating eddy current losses, it can be used in the system of this invention so that it self-regulates at the Curie temperature of the particle itself. This results from the aspect of the present invention wherein the heating occurs as a result of the magnetic particles, which are themselves nonlossy, have sufficient permeability to focus or intensify the magnetic field through the particles and, consequently, the resistive coating on the particles. When the heat from the coating on the particles heats the nonlossy particles to their Curie temperature, their permeability decreases, causing them to lose their coupling with the magnetic field. When the field is released and is not sufficiently focused, the coating on the particles will not be able to produce a high amount of heat in the lower intensity magnetic field, thereby effectively limiting the system temperature to a maximum of the Curie temperature of the nonlossy particles themselves.

It is known that ferrites can possess any range of Curie temperatures by compounding them with zinc, manganese, cobalt, nickel, lithium, iron, or copper, as disclosed in two publications: "The Characteristics of Ferrite Cores with Low Curie Temperature and Their Application" by Murkami, *IEEE Transactions on Magnetics*, June 1965, page 96, etc., and *Ferrites* by Smit and Wijn, John Wiley & Son, 1959, page 156, etc. Therefore, selection of lossy heating particles to provide desired Curie temperatures will be apparent to one skilled in the art.

In the past there has been some inconsistent usage of terminology with respect to ferromagnetic particles in the past. For example, compare the nomenclature used in White U.S. Pat. No. 3,391,846, and used in Lee, *Magnetism, an Introductory Survey*, Dover Publications, Inc, New York, 1970, FIG. 44, at page 203. The preferred nomenclature is believed to be that of Lee and is primarily used herein. See also Brailsford, *Magnetic Materials*, Methuen & Co. Ltd., London, 1960.

The term "ferromagnetic" has frequently been used to refer to magnetic particles generically regardless of their particular properties. Thus, ferrites have usually been referred to as being "ferromagnetic" or included in the general group of ferromagnetic materials. However, for purposes of this invention, it is preferred to use the terminology shown in FIG. 44 on page 203 of Lee, referred to above, wherein the magnetic particles are classified in two groups, ferromagnetic and ferrimagnetic. The ferromagnetic materials are usually considered to be electrically conductive metals which have various magnetic properties. The ferrimagnetic materials are usually considered to be electrically nonconductive magnetic oxides which also have various magnetic properties. Ferrites are considered to be electrically nonconductive materials and are thus in the class of ferrimagnetic materials. Both ferromagnetic materials and ferrimagnetic materials can be low-loss, or nonlossy, type of materials, which means they do not have significant energy loss or heat produced when subjected to an electric potential or magnetic field of a specified frequency. These nonlossy type of magnetic materials are the kind used in various electric equipment components, such as ferrite cores for coils, where no or minimum energy loss/heat production is desired. However, both these materials can also be the high-loss, or lossy, type of materials, which means they will have significant energy loss and heat production when subjected to an electric potential or magnetic field of a particular frequency. It is this class of lossy or highly lossy ferromagnetic and ferrimagnetic materials which are useful as lossy heating particles in the present invention.

Regardless of the labels or terminology for magnetic particles, the magnetic particles useful as and included within the scope of the term "lossy heating particles" for the present invention need merely to have the following properties: (1) having the desired Curie temperature for auto-regulation of the temperature when subjected to an appropriate alternating magnetic field, and (2) being sufficiently lossy, either by hysteresis losses, by eddy current losses, or both, in order to produce the desired heat when subjected to the alternating magnetic field. These particles are referred to as being "highly lossy." While the size of the particles is not particularly important in the present invention, it is desirable to use smaller particles since they can be dispersed more uniformly in the heat-recoverable material or article, thus heating more efficiently and uniformly. As recognized by one skilled in the art, the size of the particle should be no smaller than one magnetic domain, i.e., the particles should be multi-domain size particles.

Similarly, regardless of labels or terminology, the magnetic particles useful as and included within the scope of the term "nonlossy particles" for the present invention need merely to have the following properties (1) having a sufficiently high magnetic permeability to couple with the magnetic circuit selected for use, (2) being sufficiently nonlossy so that the particles do not produce a significant or an interfering amount of heat in the system and the particular magnetic field frequency and intensity selected for use, and (3) have a sufficiently high Curie temperature so that the particles do not significantly decrease in magnetic permeability in the temperature ranges desired for operation. These particles are referred to as "nonlossy high permeability particles."

It is important to note that the "nonlossy particles" and "lossy particles" are defined and selected for use with a particular magnetic field of a particular frequency and intensity. Since magnetic particles can be nonlossy at certain alternating magnetic field frequencies and lossy at other frequencies, including a particular frequency at which they exhibit peak lossiness or maximum heat generation in their particular spin resonance frequency, it can be seen that a particular magnetic particle may be used as a lossy heating particle in the system of this invention at a particular alternating magnetic field frequency and the same particle may serve as a nonlossy high permeability non-heating particle in another system according to the present invention because at the particular frequency of the magnetic field being used, the particle does not generate heat but is capable of coupling with the magnetic circuit due to its high initial permeability. Thus it will be apparent to one skilled in the art that various systems can be designed according to the present invention, as illustrated by the various embodiments disclosed herein, where particular magnetic particles will function as nonlossy non-heating particles in a certain system particularly at a particular frequency but the same particle can then become a lossy heating particle when the system is modified for example by changing the alternating magnetic field to a different frequency at which the particle exhibits its peak lossiness or heating at that particular frequency. Thus various modifications and embodiments can be utilized according to the teachings of the present invention.

The highly lossy heat producing particles useful in this invention can be any desired particle which has the desired Curie temperature and is sufficiently lossy to produce the desired amount of heating in the alternating magnetic field intended for use in connection with the system of this invention. As will be recognized by those skilled in the art, these particles are in general ferromagnetic or ferrimagnetic particles which have a high initial permeability and a high lossy component in a particular alternating magnetic field of a particular frequency. The lossy component of the ferrite particles is generally that part of the initial relative permeability which contributes to heating. This part is referred to as the $\mu''$ by Chen, *Magnetism and Metallurgy of Soft Magnetic Materials.* p.405 (1986) and Smit et al. Adv. Electronics 6:69 (1954). The higher the $\mu''$ component is for a particular particle, the more effective the particle will be as the lossy heating particles in this invention. The heat production from such particles in an alternating magnetic field is directly related to the lossy component, particle size, field strength, frequency of the alternating current powering the field, density of the particles present, as well as other factors known in the art. For example, it is known that a particular particle will produce maximum heating at a particular alternating magnetic field frequency which coincides with the presession frequency of the spin, at which point "spin resonance" occurs producing the maximum heating by that particle. Particles can be readily selected for their highly lossy heat producing properties in a particular magnetic field of a particular frequency and field strength. The particle size should be greater than at least one magnetic domain, but otherwise can be any desired particle size. The smaller particle sizes are generally preferred for more effective heating in many applications. The density of the particles used in the system of this invention will be determined by various factors, but it is generally desired to use the minimum density of particles which will produce the desired heating in the magnetic field selected for use with those particles.

As mentioned above, these highly lossy heat producing particles have a Curie temperature which is useful in the system of the present invention to make the particles self-regulating at that temperature in the particular alternating magnetic field selected for use. Various ferromagnetic and ferrimagnetic particles are well known in the art as highly lossy particles which have different Curie temperatures and can be selected accordingly. Lossy particles of different types can be mixed to provide the heating and temperature regulation characteristics desired for a particular use, including heating over a selected range, or for other purposes.

As the lossy particles present in the magnetic field produce heat and the temperature increases, these particles have a characteristic of exhibiting a declining magnetic permeability as the Curie temperature of the particles is approached. When the Curie temperature of the particles is reached, the magnetic permeability essentially drops to one and the particle produces minimal heat while it is at that temperature even though it is present in the alternating magneting field. When the temperature drops below the Curie temperature, the magnetic permeability again increases, thereby enabling the particle to again produce heat from the exposure to the alternating magnetic field. Its temperature then again increases to the Curie point where the particle again produces minimal heat because of the decrease in magnetic permeability. In this manner, the particles are self-regulating at a maximum temperature corresponding to their Curie temperature, provided the appropriate magnetic field is maintained.

These highly lossy heat producing particles can be coated, if desired, with a metallic or other coating to provide additional heating from eddy current heating in the alternating magnetic field.

As indicated, particles having different Curie temperatures can be mixed and used in the system of this invention. For example, two different lossy heating particles, one having a low and one having a high Curie temperature, can be used where rapid heating or high rate of heat input is desired in the initial stages. At the higher temperatures, the lower Curie temperature particles cease producing heat, leaving the remaining higher Curie temperature particles to continue producing heat at a lower rate compared to the initial stage when all particles were producing heat. The system of the present invention is particularly useful in such an embodiment because the coupling of the magnetic circuit is maintained at the desired intensity through the initial stage heating and into the second stage heating because the higher Curie temperature particles act as the coupling particles to maintain the focus of the magnetic field until they reach their Curie temperature. Optionally in such a system, a third particle can be included to maintain the magnetic coupling and focus at a maximum or desired intensity throughout the desired heating range. The third particle will be a nonlossy, high permeability, non-heat producing particle, as described herein.

In a similar two or three particle system as described above, the heating can be controlled or staged by the alternating magnetic field properties. For example, the particles and the magnetic field can be selected so that the first particles are heated to their Curie temperature in the first stage, but the heating contribution from the second particles does not produce sufficient heat to cause the system to exceed the first particles Curie temperature. When it is desired to further increase the temperature, the system is retuned to resonance and the field strength increased by increasing the induction coil current. The Curie temperature of the second particles will now limit the maximum operating temperature of the system. As will be apparent, multi-stage heating systems can thus be provided where each stage is self-regulated to the desired Curie temperature.

It is known in the art that a particular lossy heating particle will produce maximum heat at a particular frequency or frequency range, i.e., the frequency at which $\mu''$ is at its maximum. This characteristic of lossy heating particles provides the capability of further preferred embodiments of the present invention in which staged heating can be achieved. Thus the particle system according to the present invention can be designed so that the system will heat to a first temperature and self-regulate at that temperature, then the system can be adjusted so that the system will then heat to a second temperature and self-regulate at that temperature. As an illustration, the particle systems according to the present invention can be formulated using a first lossy heating particle having a Curie temperature of $T_1$ which produces its maximum heating at alternating magnetic field frequency $F_1$ together with a second lossy heating particle which has a higher Curie temperature $T_2$, which produces its maximum heating at a second frequency $F_2$, and produces little, if any, heating at the first frequency $F_1$. In accordance with this invention, the nonlossy non-heat producing particles are incorporated to provide the continued magnetic circuit coupling throughout the operation. In operation of such a system, the alternating magnetic field would be produced with a power supply set at frequency $F_1$ to heat the system to self-regulating temperature $T_1$. After the temperature $T_1$ has been maintained for the desired length of time, the power supply is then adjusted to shift the frequency to frequency $F_2$, which will then cause the alternating magnetic field to produce heat from the second lossy heating particles thus heating the system to the second self-regulating Curie temperature $T_2$. This effect can be especially pronounced if one or both of the frequencies corresponds to the spin resonance frequency. Various other variations and configurations of the particle systems of the present invention will be apparent to one skilled in the art.

The nonlossy non-heat producing particles used in the present invention are also known in the art as particles which have a high magnetic permeability, but are not lossy and consequently do not produce a significant amount of heat in the system of this invention. Such particles can be ferromagnetic particles, or ferrimagnetic particles, which have these properties. Since these particles do not produce heat, the Curie temperature of the particles is generally not a critical consideration for these particles. However, as indicated above when these particles are used in thermal proximity to the highly lossy heat producing particles described above, it is necessary that these nonlossy non-heat producing particles have a Curie temperature above the Curie temperature of the lossy particles in order that these nonlossy particles do not lose their magnetic permeability throughout the heating interval for which the system of this invention is used. The magnetic circuit coupling according to this invention will be accomplished when a sufficient density of the nonlossy particles is used to maintain the desired intensity or focus of the magnetic field in the desired area where the lossy heating particles are situated.

The ratio of the highly lossy heat producing particles to the nonlossy non-heat producing particles can be any effective ratio, but will generally be between about 10:1 to 1:10, preferably from about 2 to 1, and most preferably from about 1 to about 1. As indicated above, the lossy particles and the nonlossy particles may be used as mixtures or may be used as separate layers in the system of the present invention. It is merely important that lossy and the nonlossy particles be situated in magnetic proximity to one another in order that the nonlossy particles can maintain the coupling and the intensity of the magnetic field through the area in which the lossy particles are situated. On the other hand, it is not necessary that the lossy particles and the nonlossy particles be in thermal proximity or thermal contact, but may be if convenient or desired.

The lossy and/or nonlossy particles useful in the practice of this invention may be electrically conductive or nonconductive, as desired for particular end use applications of the system of this invention. In some applications, it is desired to have nonconductive particles, especially where they are not removed from the substrate or article after the heating is completed. For example, in electrical connectors it may not be desirable to have conductive particles remaining in the connector or the insulating layers of the connectors, in which case it will be desirable to either use nonconductive particles or use a configuration of the system of this invention which enables conductive particles to be removed after the desired heating has been completed.

The alternating magnetic field useful in the present invention may be any desired alternating magnetic field but preferably will have a frequency of at least about 10 KHZ, which has been recognized in the art as an effective alternating magnetic field for induction heating.

In view of the above general description and the description of particular embodiments, it will be apparent to one skilled in the art following these teachings that numerous variations and embodiments of this invention can be adapted for various desired uses.

The following examples are set forth to illustrate particular preferred embodiments of the system of the present invention. It is to be understood the above description that the following examples are set forth to enable one skilled in the art to practice this invention and the scope of this invention is defined by the claims appended hereto.

In the following example, the following equipment was used to test the various materials. The power supply was an RFG 30 available from Metcal, Inc., Menlo Park, Calif., having maximum power of 40 watts and modified for externally adjustable current set point. The net power meter was a NPM-50 available from Metcal, Inc. A chart recorder, Hewlett-Packard 7004B x-y Recorder, and an R.F. Vector Impedance Meter, Hewlett-Packard 4815 A, were used. The induction coil was 16 turns of 19 AWG, HML insulated wire, 0.300 inch inside diameter. The test capsule size was 1.5 inches long by 0.300 inch outside diameter. The shrink tubing was polyolefin with a 2 to 1 shrink ratio and a recovery temperature of 121° C. The ferrite powders were obtained from Trans-Tech, Adamstown, Md. The powdered metals were obtained from Aremco Products, Ossining, N.Y.

In order to initially characterize the ferrite powders, they were encapsulated in a 1.5 inch long piece of plastic tubing 0.300 inches in diameter. This capsule was then inserted in the induction coil and this assembly was series resonated using a Hewlett-Packard R.F. Vector Impedance Meter. The resistive impedance was recorded at various frequencies from 3 to 20 MHz. Using this data, it was found that both TT1-414 and TT1-1500 were highly lossy at the desired 13.56 MHz power supply operating frequency. TT2-111, on the other hand, was not lossy from 3.2 to 20.0 MHz. The corresponding Curie temperatures of the materials are as follows:

| Ferrites: | |
|---|---|
| TT1-414 | $T_c$ 90° C. |
| TT1-1500 | $T_c$ 180° C. |
| TT2-111 | $T_c$ 375° C. |

-continued

| Powdered Metals: | |
|---|---|
| Ni 351 - 50% nickel 50% iron | $T_c$ 500° C. |
| Fe 307 - 99.9% iron | $T_c$ 770° C. |

By mixing the powdered ferrites with a RTV silicone adhesive and then nip rolling this mixture through the inside of a piece of polyolefin heat shrinkable tubing, a thin coating of ferrite and adhesive was achieved on the tubing inner wall. The distance between the nip rolls was held constant so that all samples would contain the same amount of ferrite loading. After the adhesive had cured, the various samples were cut into one-inch lengths and inserted into the induction coil. Each sample was tuned to series resonance by adjusting a variable capacitor. This assembly was then connected to the output of the net power meter which in turn was connected to the output of the power supply. The net power meter output was connected to a Hewlett-Packard 7004B x-y Plotter in order to record net power in watt versus time. This plot would give a permanent record of the total energy delivered to the loaded heat shrink tubing. Testing consisted of turning on the power supply and monitoring the net power versus time and the temperature of the tubing. Temperature was measured using an alcohol thermometer inserted inside the tubing. It was found that a 50/50 mixture of TT2-111 and TT1-1500 gave the largest power/time profile yet regulated at the Tc of 180° C. Later tests with TT2-111 alone at increased loading levels of ferrite demonstrated that, despite not being as lossy as TT1-414 or TT1-1500, it could be heated but was too hot since its Curie temperature of 375° C. is well above the maximum temperature limit of the tubing, which is 135° C. Tests with TT1-414 having a Curie temperature of 90° C. did not recover the tubing since the device self-regulated at 90° C. which is below the tubing recovery temperature of 121° C.

Thus, the combination of a lossy ferrite TT1-1500 and a nonlossy high permeability ferrite TT2-111 proved to be the best combination.

The resistive impedance data show that it is possible to achieve a multi-temperature device. For example, by combining TT1-414 $T_c$ of 90° C. and TT1-1500 $T_c$ of 180° C. and operating at approximately 10 MHz, a device with two self-regulation temperatures could be achieved. This is due to the fact that at this frequency most of the resistive impedance is due to the TT1-414 material, yet when the device is heated to a temperature of 90° C., the impedance due to the TT1-414 material would drop, leaving only the impedance contribution due to TT1-1500 with its higher Curie temperature of 180° C. Thus, after the first regulation temperature is achieved, the system can be retuned to resonance and the current increased so the system would continue to heat to 180° C., the Curie temperature of the TT1-1500. By using a variable frequency power supply, this approach could be especially enhanced. For example, using the same two materials, TT1-414 and TT1-1500, and operating first at 10 MHz where only TT1-414 is lossy and then increasing the frequency to 20 MHz where TT1-1500 is lossy, a higher switching ratio could be achieved.

The following Table I shows the resistive impedance for the above materials at various frequencies.

TABLE I

| | Particle Type | Particle Size (Microns) | Resistive Impedance Ω |
|---|---|---|---|
| At 3.2 MHz: | | | |
| COIL ONLY | — | — | 0.6 |
| TT2-111 | nickel-zinc ferrite | 38 | 1.0 |
| TT1-414 | magnesium ferrite | 38 | 2.0 |
| TT1-1500 | nickel-zinc ferrite | 38 | 1.2 |
| FE 307 | 99.9% iron | 150 | 1.4 |
| NI 351 | 50% nickel, 50% iron | 5 | 3.6 |
| At 5.0 MHz: | | | |
| COIL ONLY | — | — | 1.0 |
| TT2-111 | nickel-zinc ferrite | 38 | 1.2 |
| TT1-414 | magnesium ferrite | 38 | 6.0 |
| TT1-1500 | nickel-zinc ferrite | 38 | 1.5 |
| FE 307 | 99.9% iron | 150 | 2.0 |
| NI 351 | 50% nickel, 50% iron | 5 | 6.6 |
| At 10.0 MHz: | | | |
| COIL ONLY | — | — | 1.0 |
| TT2-111 | nickel-zinc ferrite | 38 | 2.2 |
| TT1-414 | magnesium ferrite | 38 | 3.0 |
| TT1-1500 | nickel-zinc ferrite | 38 | 7.0 |
| FE 307 | 99.9% iron | 150 | 9.0 |
| NI 351 | 50% nickel, 50% iron | 5 | 28.0 |
| At 13.56 MHz: | | | |
| COIL ONLY | — | — | 2.0 |
| TT2-111 | nickel-zinc ferrite | 38 | 1.3 |
| TT1-414 | magnesium ferrite | 38 | 60.0 |
| TT1-1500 | nickel-zinc ferrite | 38 | 40.0 |
| FE 307 | 99.9% iron | 150 | 20.0 |
| NI 351 | 50% nickel, 50% iron | 5 | 68.0 |
| At 20.0 MHz: | | | |
| COIL ONLY | — | — | 10.0 |
| TT2-111 | nickel-zinc ferrite | 38 | 27.0 |
| TT1-414 | magnesium ferrite | 38 | 220.0 |
| TT1-1500 | nickel-zinc ferrite | 38 | 200.0 |
| FE 307 | 99.9% iron | 150 | 80.0 |
| NI 351 | 50% nickel, 50% iron | 5 | 105.0 |

What is claimed is:

1. A self-heating recoverable article for use in an alternating magnetic field, comprising in combination:
   a) a layer of heat recoverable material having recovery temperature T, and
   b) a system of particles capable of producing heat upon being subjected to an alternating magnetic field, wherein:
   at least a portion of said particles being in thermal contact with said layer of heat recoverable material and thereby being capable of heating said material to at least a temperature of T upon the article being subjected to said alternating magnetic field; and
   said system of particles comprises first particles which are lossy heating particles having a Curie temperature of T or greater; and second particles which are nonlossy particles and have high permeability, thereby being capable of providing magnetic circuit coupling when the first particles are at or near their Curie temperature.

2. An article according to claim 1 wherein the first particles comprise ferromagnetic particles.

3. An article according to claim 1 wherein the first particles comprise ferrimagnetic particles.

4. An article according to claim 1 wherein the second particles comprise ferromagnetic or ferrimagnetic particles.

5. An article according to claim 1 wherein the first particles and the second particles are present in the form of a mixture.

6. An article according to claim 1 wherein the first particles or the second particle are dispersed in the heat recoverable material.

7. An article according to claim 1 wherein the first particles or the second particles comprise a layer on a surface of the heat recoverable material.

8. An article according to claim 1 wherein the first particles and the second particles form separate layers on a surface of the heat recoverable material.

9. An article according to claim 1 wherein the first particles form a layer on one surface of the heat recoverable material and the second particles form a layer on the opposite surface of the heat recoverable material.

10. A composition comprising particles capable of producing heat upon being subjected to an alternating magnetic field comprising in combination:
(i) first particles which are lossy heating particles and which have a Curie temperature of $T_1$; and
(ii) second particles which are nonlossy particles, which have a Curie temperature of $T_2$ and which have high permeability, being in magnetic proximity to the first particles, thereby being capable of providing magnetic circuit coupling through the first particles.

11. A composition according to claim 10 wherein $T_2$ is greater than $T_1$.

12. A composition according to claim 10 wherein $T_2$ is less than $T_1$.

13. A composition according to claim 10 wherein the first particles comprise ferromagnetic particles.

14. A composition according to claim 10 wherein the first particles comprise ferrimagnetic particles.

15. A composition according to claim 10 wherein the second particles comprise ferromagnetic or ferrimagnetic particles.

16. A composition according to claim 10 wherein the first particles and the second particles are present in the form of a mixture.

17. A system of particles for producing heat when subjected to an alternating magnetic field comprising:
a first layer of particles comprising lossy heating particles which have a Curie temperature of $T_1$; and
a second layer of particles comprising nonlossy particles, which have a Curie temperature of $T_2$ and which have high permeability, being in magnetic proximity to the first particles, thereby being capable of providing magnetic circuit coupling through the first particles.

18. A system according to claim 17 wherein $T_2$ is greater than $T_1$.

19. A system according to claim 17 wherein $T_2$ is less than $T_1$.

20. A system according to claim 17 wherein the first particles comprise ferromagnetic particles.

21. A system according to claim 17 wherein the first particles comprise ferrimagnetic particles.

22. A system according to claim 17 wherein the second particles comprise ferromagnetic or ferrimagnetic particles.

23. An article for use in an alternating magnetic field comprising in combination:
a) a material suitable for heating to a temperature T, and
b) a system of particles capable of producing heat upon being subjected to an alternating magnetic field, wherein:
at least a portion of said particles being in thermal contact with said material and thereby being capable of heating said material upon the article being subjected to said alternating magnetic field; and
said particles comprise first particles which are lossy heating particles having a Curie temperature of $T_1$; and second particles which are nonlossy particles, which have a Curie temperature of $T_2$ and have high permeability thereby being capable of providing magnetic circuit coupling through the first particles.

24. An article according to claim 23 wherein the material suitable for heating is a thermoplastic material.

25. An article according to claim 23 wherein the material suitable for heating chemically reacts upon heating.

26. An article according to claim 23 wherein the material suitable for heating comprises a solvent which is evaporated upon heating.

27. An article according to claim 23 wherein the material suitable for heating produces a gas upon heating.

28. An article according to claim 23 wherein $T_1$ and $T_2$ are both equal to or greater than T.

29. An article according to claim 28 wherein $T_1$ is greater than $T_2$.

30. An article according to claim 28 wherein $T_2$ is greater than $T_1$.

31. A method for providing heat to a substrate comprising:
providing a system of particles in thermal contact with said substrate comprising first particles which are lossy heating particles being capable of producing heat upon being subjected to an alternating magnetic field, and comprising second particles which are nonlossy particles having a high permeability and being capable of providing magnetic circuit coupling through the first particles; and
subjecting the substrate and system of particles to an alternating magnetic field.

32. A method according to claim 31 wherein the Curie temperature of the first particles is greater than the Curie temperature of the second particles.

33. A method according to claim 31 wherein the Curie temperature of the second particles is greater than the Curie temperature of the first particles.

34. A method according to claim 33 wherein initial heating to the Curie temperature of the first particles is generated at field frequency $F_1$ followed by heating to the Curie temperature of the second particles at field frequency $F_2$.

35. A method according to claim 31 wherein the alternating magnetic field is provided by an induction coil powered by a constant current power supply.

36. A method according to claim 31 wherein at least a portion of the particles are provided in a layer and are then removed after heating.

37. An auto-regulating system for heating an article comprising, in combination:
an article for use in an alternating magnetic field, comprising a material in said article suitable for heating to a temperature T, lossy heating particles in thermal contact with said material and thereby being capable of heating said material upon the article being subjected to said alternating magnetic field, and nonlossy particles having sufficiently high permeability whereby they are capable of providing magnetic circuit coupling through the lossy heating particles;
an induction coil adapted to produce said magnetic field; and a power supply being adapted to provide power to the induction coil as alternating current at a frequency effective for heating said particles.

38. A system according to claim 37 wherein the power supply comprises a constant current power supply.

39. An assembly comprising:
an induction coil adapted to produce an alternating magnetic field;
an article positioned in said alternating magnetic field, comprising a material in said article suitable for heating to a temperature T, lossy heating particles in thermal contact with said material and thereby being capable of heating said material upon the article being subjected to said alternating magnetic field, and nonlossy particles having sufficiently high permeability whereby they are capable of providing magnetic circuit coupling through the lossy heating particles; and
a power supply connected to said induction coil, said power supply being adapted to provide power to the induction coil as alternating current at a frequency effective for heating said particles.

40. An assembly according to claim 39 wherein the power supply comprises a constant current power supply.

* * * * *

UNITED STATES PATENT AND TRADEMARK OFFICE
CERTIFICATE OF CORRECTION

PATENT NO. : 5,126,521

DATED : June 30, 1992

Page 1 of 2

INVENTOR(S) : Thomas H. Mcgaffigan

It is certified that error appears in the above-indentified patent and that said Letters Patent is hereby corrected as shown below:

In the Abstract, line 3, delete "disclosed" and insert --discloses-- therefor

Column 1, line 7, after "abandoned", insert a --,--;

Column 3, line 52, delete "no-" and insert -- non- -- therefor;

Column 3, line 53, delete "nlossy" and insert --lossy-- therefor;

Column 6, line 17, delete "no-" and insert -- non- -- therefor;

Column 6, line 18, delete "nlossy" and insert --lossy-- therefor;

Column 6, line 23, delete "no-" and insert -- non- -- therefor;

Column 6, line 24, delete "nlossy" and insert --lossy-- therefor;

Column 8, line 25, delete "no-" and insert -- non- -- therefor;

UNITED STATES PATENT AND TRADEMARK OFFICE
CERTIFICATE OF CORRECTION

PATENT NO. : 5,126,521
DATED      : June 30, 1992
INVENTOR(S) : Thomas H. McGAFFIGAN It is certified that error appears in the above-indentified patent and that said Letters Patent is hereby corrected as shown below:

Column 8, line 26, delete "nlossy" and insert --lossy-- therefor;
Column 10, line 9, after "ing", insert a --.--;
Column 11, line 40, after "netics", delete the "." and insert a --,-- therefor
Column 11, line 41, after "Wijn", delete "." and insert a --,-- therefor;
Column 11, line 49, after "Inc", insert a --.--;
Column 12, line 40, after "properties", insert a --:--;
Column 13, line 28, after "rials", delete "." and insert a --,-- therefor;

Signed and Sealed this

Twenty-fourth Day of August, 1993

Attest:

BRUCE LEHMAN

Attesting Officer

Commissioner of Patents and Trademarks